May 16, 1939.  T. BRYANT  2,158,398
AUTOMOBILE TIRE
Filed Feb. 15, 1936 2 Sheets-Sheet 1

Inventor:
Tom Bryant,
A P Greeley
Att'y.

May 16, 1939.  T. BRYANT  2,158,398
AUTOMOBILE TIRE
Filed Feb. 15, 1936   2 Sheets-Sheet 2
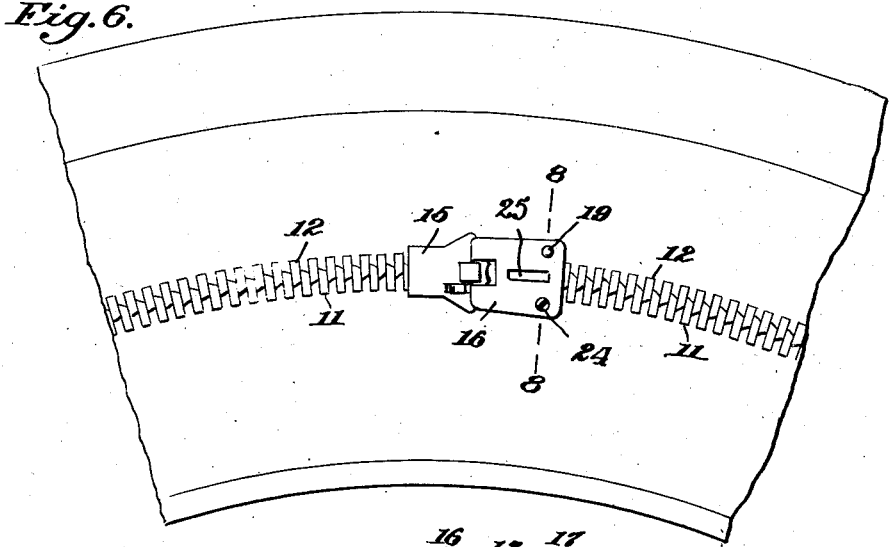
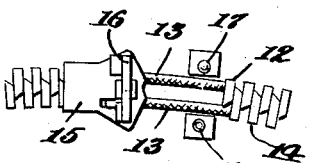
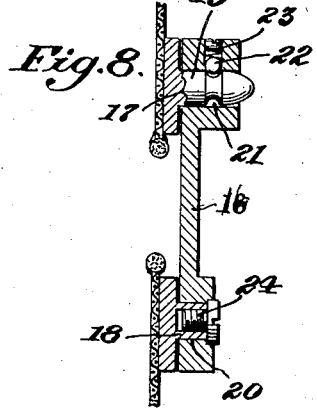
Inventor:
Tom Bryant, Patented May 16, 1939

2,158,398

UNITED STATES PATENT OFFICE 2,158,398

AUTOMOBILE TIRE

Tom Bryant, Cross Plains, Tex.

Application February 15, 1936, Serial No. 64,113

2 Claims. (Cl. 152—363)

My invention relates to pneumatic tires such as are used on automobile wheels. The tires commonly used comprise an outer relatively heavy tubular tread member having its periphery formed of wear resistant material of sufficient thickness to withstand contact with the roadway surface, and an inner tube of relatively thin elastic material which when inflated holds the tread member distended. The outer or tread member, commonly referred to as the tire, is necessarily so formed as to have an opening extending about it to permit of insertion and removal of the inner tube. Ordinarily as in the so-called clincher tire, this opening is along the inner periphery, and on opposite edges of the opening lateral extensions are provided to be engaged by the wheel rim. In order to remove or insert an inner tube it is necessary to disengage the tire from the rim, an operation of considerable difficulty and taking considerable time.

It is an object of my present invention to provide a tire, that is the outer or tread member, which can be opened for insertion or removal of the inner tube without disengaging it from the rim so that the operation of removing the damaged inner tube and its replacement with a better tube may be effected quickly and easily.

It is a further object of my invention to provide a tire with a longitudinal opening in one side or in its outer periphery or tread portion independent of any opening which may be in the inner periphery.

A further object of my invention is to provide a tire having a longitudinal opening in one side or in its outer periphery with means for protecting the inner tube against being pinched by the outer member when the inner tube is collapsed.

A further object of the invention is to make use for closing the opening, of a multiple operated separable fastener such as is commonly known as the zipper closure.

With the above objects and other objects hereinafter explained in view, my invention consists in the construction and combination of elements hereinafter described and claimed.

Referring to the drawings:

Figure 6 is a side view of the construction shown in Figure 1 on an enlarged scale, showing the slider and pull in locking position.

Figure 7 is a view of the slider and pull of Figure 6 but showing the pull in unlocked position, and Figure 8 is a cross sectional view on line 8—8 of Figure 6.

Figure 1:
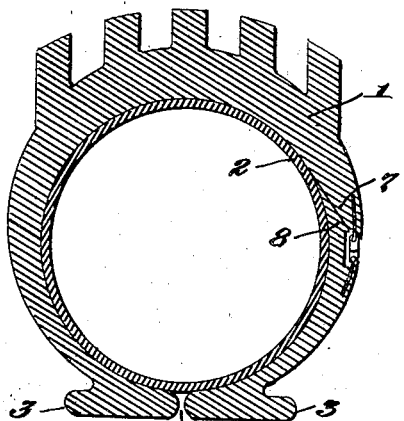
Figure 1 is a cross sectional view of an automobile tire embodying my invention having the longitudinal opening on one side.

In the drawings 1 indicates the outer member of a pneumatic tire such as is used on automobiles and is commonly termed the tire though a complete tire has to have the inner tube 2 containing air under pressure. The tire shown is of the clincher type, that is, it has on its inner periphery lateral extensions 3, 3, which when the air pressure within the inner tube 2 is reduced may be inserted between the inturned edges of the wheel rim so that when the pressure of air in the inner tube is increased these extensions will be caused to engage the edges of the rim so as to hold the tire in position. In Figure 1 the tire is shown with a longitudinal opening 4 in its inner periphery which is usual in clincher tires to form the opening through which inner tube 2 may be inserted or withdrawn. Tires embodying my invention may or may not have this opening in the inner periphery, and in Figures 2, 3, and 4, the tire has no opening in its inner periphery.

Inner tubes are always liable to leak from puncture or from other cause and collapse, leaving the outer member or tire 1 to collapse, resulting in a flat tire. This necessitates either taking off the entire wheel and substituting a spare wheel or the removal of the inner tube to be repaired and replaced or to have a nonleaking inner tube substituted.

In order to remove the inner tube in a tire of ordinary construction the extensions 3, 3, must be pried loose from the wheel rim, an operation involving considerable time and effort, the anchor strip and cord being arranged at such distance from the outer peripheral faces of the edges of the opening that the fasteners will be wholly within the outer peripheral line of the tire particularly if a tire goes flat when the automobile is at a distance from a garage. This effort and loss of time is prevented by the tire construction of my present invention.

In the several forms of tire shown in the drawings the opening through which the inner tube may be inserted or removed is formed longitudinally, not in the inner periphery, but in one side or in the outer periphery or tread portion 5, the edges of the opening being held together by a readily detachable securing means.

Figure 2:
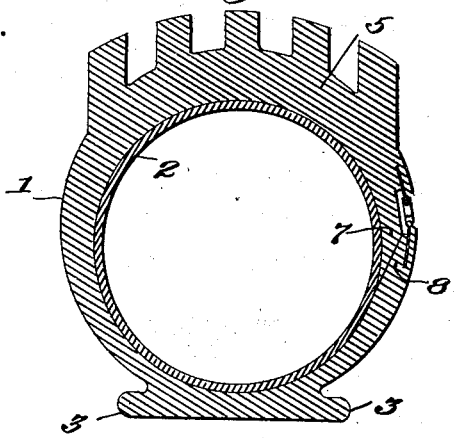
Figure 2 is a view similar to Figure 1, but showing a modification.
Figure 3:
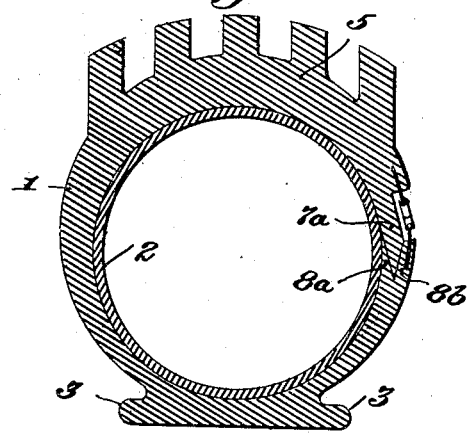
Figure 3 is a view similar to Figure 1, but shows a further modification.
Figure 5:
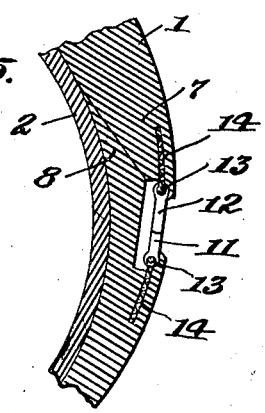
Figure 5 is a detail cross sectional view showing the construction shown in Figure 1 on an enlarged scale.

When the longitudinal opening is in the side as shown in Figures 1 to 3, 5, 6, and 7, inner tube 2 is guarded against being pinched by the tire by forming the opening on a line at an angle to a diameter so as to leave a tapering upper flap 7 fitting over a tapering lower flap 8 as shown in Figures 1 and 5, or so as to leave tapering lower flap extending over tapering upper flap 7 as shown in Figure 2. Or, as shown in Figure 3, the upper flap 7a may be wedge shaped so as to enter a V shaped recess between an inner lower flap 8a and an outer lower flap 8b.

Figure 4:
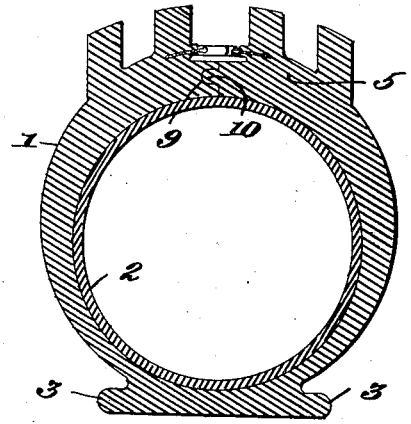
Figure 4 is a cross sectional view of an automobile tire having the longitudinal opening in the tread portion.

When the longitudinal opening is made in the outer periphery or tread portion as shown in Figure 4 the left hand edge of the opening, as shown in the figure, is provided with recess 9 to receive projection 10 on the right hand edge.

The means for holding the horizontal opening closed whether in the side or in the outer periphery, which I prefer to use, is of the type commonly known as the zipper comprising metallic fastener elements secured one on each edge of the opening and caused to be brought into or out of interlocking relation by a "slider" to which is hinged a "pull" adapted to be grasped by the hand.

Each series of metallic interlocking fasteners 11, 12, is carried by a flexible cord 13, see Figure 7, which is anchored in the material of the tire above or below the edge of the opening as by anchor strip 14 embedded in the material of the tire. The slider 15 which by its movement causes the engagement or disengagement of the metallic fastener elements is provided with pull 16 hinged to the slider.

After the tire has been opened, the defective inner tube removed, and a sound inner tube put in, the pull 16 is grasped by the hand and caused to move from the position in which it is shown in Figure 7, to the right and around to the position in which it is shown in Figure 6, causing, by its movement around the tire, the metallic fastener elements 11 and 12 to interlock.

In order to permit of initial engagement of a slider 15 with the two series of metallic fastener elements, cords 13 are, for a short distance, as shown in Figure 7, without the fastener elements. At this end of the series of fastener elements I provide on opposite sides of the opening parts 17 and 18, having sufficient space between them for passage of the slider. In order to lock the slider in position after the fastener elements have been caused to interlock its pull 16 is provided with openings 19 and 20 so spaced apart as to be adapted to engage parts 17 and 18 respectively.

Part 17 is provided with circumferential groove 21 and opening 19 in the pull is provided in its wall with yielding locking means consisting of ball 22 pressed inward by spring 23.

Part 18 is bored out and the bore threaded to receive headed screw 24.

Between the openings 17 and 18 the pull 16 is provided with slot 25 adapted to receive the end of a screw driver or similar tool.

When the slider is brought around to the position in which it is shown in Figure 6 the pull is swung over onto parts 17, 18, and pressed down to cause part 17 to enter opening 19 in which it will be retained by ball 22 holding the slider temporarily locked. Screw 24 may then be inserted to effect a permanent locking.

In the construction shown in Figures 1 to 3 and 5, the tapering form of the flaps makes it impossible to pinch the inner tube whether inflated or not. One row or series of metallic fasteners is arranged at the extreme edge of one of the flaps while the other row or series is secured to the other flap at a substantial distance from its edge.

When the longitudinal opening is in the tread portion of the tire a groove between protruding portions of the tread may be utilized as the recess which otherwise needs to be formed in the material of the tire to receive the slider and permit it to be moved around the tire.

While my invention is hereinabove described as embodied in an automobile tire this is to be understood as illustrative of its use rather than as limiting its use as it is obvious that the invention may be applied to any tube having a longitudinal opening in it. I do not desire to be limited to any particular shape of the flaps or the shape of the meeting edges of the longitudinal opening in the tread portion. Nor do I desire to be limited to the particular construction of the means for holding the opening closed.

Having thus described my invention, what I claim is:

1. A divided pneumatic tire casing having an annular slit in one of the side walls, a recess adjacent said slit in which a continuous sliding fastening means is secured, means adjacent the outer circumference of the casing for securing said fastening means within said recess, said fastening means lying within the outer circumference of the said casing, said slit having a tapered side wall extending outwardly and downwardly from the inner surface of said casing and terminating within said recess, the opposite side of said slit being tapered inwardly and upwardly from said recess to correspond with the first mentioned side wall of said slit and adapted to form a continuous unobstructed inner surface within said casing when the said slit is closed by the said fastening means.

2. A divided pneumatic tire casing having an annular slit in one of its side walls, a recess adjacent said slit in which a continuous fastening means is secured, means adjacent the outer circumference of the casing for securing said fastening means within said recess, said securing means being supported within the two opposite side walls of the recess, a portion of said casing extending over the outer surface of the said securing means for protecting the same, said fastening means adapted to lie wholly within the outer cross-sectional circumference of the said casing, said slit having a tapered side wall extending outwardly and downwardly from the inner surface of said tire casing and terminating within said recess, the opposite side of said slit being tapered inwardly and upwardly from the recess to correspond with the first mentioned tapered side wall and adapted to form a continuous unobstructed circular inner surface within said casing when the said fastening means is closed.

TOM BRYANT.